United States Patent
Matsuo (10) Patent No.: US 11,259,221 B2
(45) Date of Patent: Feb. 22, 2022

(54) BASE STATION AND COMMUNICATION METHOD

(71) Applicant: Panasonic Intellectual Property Management Co., Ltd., Osaka (JP)

(72) Inventor: Hidenori Matsuo, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 30 days.

(21) Appl. No.: 16/527,532

(22) Filed: Jul. 31, 2019

(65) Prior Publication Data

US 2019/0357094 A1 Nov. 21, 2019

Related U.S. Application Data

(63) Continuation of application No. PCT/JP2017/015641, filed on Apr. 19, 2017.

(30) Foreign Application Priority Data

Feb. 16, 2017 (JP) .............................. JP2017-026689

(51) Int. Cl.
*H04W 36/08* (2009.01)
*H04W 36/20* (2009.01)
(Continued)

(52) U.S. Cl.
CPC ... *H04W 36/0058* (2018.08); *H04W 28/0268* (2013.01); *H04W 36/0033* (2013.01); *H04W 36/08* (2013.01)

(58) Field of Classification Search
CPC ..... H04W 16/08; H04W 16/32; H04W 24/02; H04W 24/10; H04W 36/0033;
(Continued)

(56) References Cited

U.S. PATENT DOCUMENTS

2011/0116395 A1* 5/2011 Tsuda .................... H04W 28/18
370/252
2011/0255515 A1* 10/2011 Maeda .................. H04W 36/18
370/331
(Continued)

FOREIGN PATENT DOCUMENTS

JP 2008-236682 A 10/2008
JP 2011-109539 A 6/2011
(Continued)

OTHER PUBLICATIONS

International Search Report, dated Jun. 20, 2017, for corresponding International Application No. PCT/JP2017/015641, 3 pages.
(Continued)

*Primary Examiner* — Edan Orgad
*Assistant Examiner* — Vanneilian Lalchinthang
(74) *Attorney, Agent, or Firm* — Seed IP Law Group LLP (57) ABSTRACT

A base station relates to a wireless communication system that performs handover from a cell connected with a terminal to a neighbor cell of the cell. The base station includes: circuitry, which, in operation, sets an offset to be applied to reception quality of the neighbor cell according to a quality of service (QoS) class identifier (QCI) of the terminal when the terminal determines whether to report a measurement result to be used in determination on the handover; and a transmitter, which, in operation, transmits the offset to the terminal.

10 Claims, 7 Drawing Sheets

(51) Int. Cl.
*H04W 36/00* (2009.01)
*H04W 28/02* (2009.01)

(58) Field of Classification Search
CPC .......... H04W 36/00837; H04W 36/08; H04W 28/0268; H04W 36/30; H04W 36/0058; H04W 36/04; H04W 36/20
USPC ........................................................ 370/331
See application file for complete search history.

(56) References Cited

U.S. PATENT DOCUMENTS

| | | | | |
|---|---|---|---|---|
| 2013/0010763 | A1* | 1/2013 | Chen | H04L 5/001 370/331 |
| 2014/0211763 | A1* | 7/2014 | Choi | H04W 36/0085 370/332 |
| 2015/0078344 | A1* | 3/2015 | Futaki | H04W 24/02 370/332 |
| 2015/0263836 | A1* | 9/2015 | Kim | H04W 76/15 370/329 |
| 2015/0326258 | A1* | 11/2015 | Song | H04B 17/382 455/127.2 |
| 2015/0373772 | A1 | 12/2015 | Watanabe et al. | |
| 2016/0021592 | A1* | 1/2016 | Vesely | H04B 7/024 370/331 |
| 2017/0332279 | A1* | 11/2017 | Kobayashi | H04W 4/06 |
| 2018/0368043 | A1* | 12/2018 | Ramachandra | H04W 36/00835 |

FOREIGN PATENT DOCUMENTS

| | | |
|---|---|---|
| JP | 2012-523785 A | 10/2012 |
| JP | 2013-120950 A | 6/2013 |
| JP | 2014-014038 A | 1/2014 |
| JP | 2014014038 A * | 1/2014 |
| WO | 2010/120026 A1 | 10/2010 |
| WO | 2013/136811 A1 | 9/2013 |
| WO | 2014/122706 A1 | 8/2014 |
| WO | 2014/136441 A1 | 9/2014 |

OTHER PUBLICATIONS

3GPP, "LTE; Evolved Universal Terrestrial Radio Access Network (E-UTRAN); X2 Application Protocol (X2AP)," Technical Specification 36.423, Version 13.6.0, Release 13, Jan. 2017, 239 pages.
3GPP, "Universal Mobile Telecommunications System (UMTS); LTE; Multimedia Broadcast/Multicast Service (MBMS); Architecture and functional description," Technical Specification 23.246, Version 14.2.0, Release 14, Oct. 2017, 78 pages.

* cited by examiner

| QCI | Resource Type | Priority Level | Packet Delay Budget | Packet Error Loss Rate | Example Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Voice (Live Streaming) |
| 3 | GBR | 3 | 50 ms | $10^{-3}$ | Real Time Gaming |
| 4 | GBR | 5 | 300 ms | $10^{-6}$ | Non-Conversational Voice (Buffered Streaming) |
| 65 | GBR | 0.7 | 75 ms | $10^{-2}$ | Mission Critical user plane Push To Talk voice (e.g., MCPTT) |
| 66 | GBR | 2 | 100 ms | $10^{-2}$ | Non-Mission-Critical user plane Push To Talk voice |
| 75 | GBR | 2.5 | 50 ms | $10^{-2}$ | V2X messages |
| 5 | Non-GBR | 1 | 100 ms | $10^{-6}$ | IMS Signalling |
| 6 | Non-GBR | 6 | 300 ms | $10^{-6}$ | Video (Buffered Streaming) TCP-based (e.g., www, e-mail, chat, ftp, p2p file sharing, progressive video, etc.) |
| 7 | Non-GBR | 7 | 100 ms | $10^{-3}$ | Voice, Video (Live Streaming) Interactive Gaming |
| 8 | Non-GBR | 8 | 300 ms | $10^{-6}$ | Video (Buffered Streaming) TCP-based (e.g., www, e-mail, chat, ftp, p2p file sharing, progressive video, etc.) |
| 9 | Non-GBR | 9 | 300 ms | $10^{-6}$ | |
| 69 | Non-GBR | 0.5 | 60 ms | $10^{-6}$ | Mission Critical delay sensitive signalling (e.g., MC-PTT signalling) |
| 70 | Non-GBR | 5.5 | 200 ms | $10^{-6}$ | Mission Critical Data (e.g., example services are the same as QCI 6/8/9) |
| 79 | Non-GBR | 6.5 | 50 ms | $10^{-2}$ | V2X messages |

FIG. 8

| IE/Group Name | Presence | Range | IE type and reference | Semantics description |
|---|---|---|---|---|
| Handover Trigger Change | M | | INTEGER (-20..20) | The actual value is IE value∗ 0.5 dB. |
| CIO Correction Policy (e.g. $\alpha_{QCI}$, Threshold of Allowable Delay Time) | | | | |

BASE STATION AND COMMUNICATION METHOD

RELATED APPLICATIONS

This application is a continuation of PCT International Application No. PCT/JP2017/015641, filed on Apr. 19, 2017, which claims the benefit of foreign priority of Japanese patent application 2017-026689 filed on Feb. 16, 2017, the contents all of which are incorporated herein by reference.

BACKGROUND

1. Technical Field

The present disclosure relates to a base station and a communication method.

2. Description of the Related Art

In the 3rd generation partnership project (3GPP), a heterogeneous network (HetNet) has been studied. In HetNet, in addition to a macro cell, which is a cell of a base station having high transmission power (also referred to as eNB), a small cell, which is a cell of a base station having low transmission power, is disposed in the macro cell.

Furthermore, in the 3GPP, traffic offloading using cell range expansion (CRE) in a HetNet environment has been studied. As a method for the traffic offloading using the CRE, for example, a base station having high traffic (e.g., a base station of a macro cell (macro base station: Macro eNB)) sets a cell individual offset (CIO) that is individually set for each base station in the small cell (small base station: Small eNB) near the macro cell higher. This causes a terminal (also referred to as a user equipment (UE)) that is connected to the macro cell and is located at a cell edge of the small cell to be handed over (offloaded) to the small cell.

As an example, an occurrence condition of an event in which a terminal reports a measurement result (Measurement Report) to be used for determination on the handover from the macro cell (Source Cell) to the small cell (Neighbor Cell), that is, a condition triggering the handover (e.g., Event A3) is expressed as follows.

(Reception quality of a small cell (Neighbor Cell))+
CIO>(reception quality of a macro cell (Source
Cell))                        (1)

By setting the CIO higher in the expression (1), even when actual reception quality of the small cell is lower than reception quality of the macro cell, apparent reception quality of the small cell is set higher, whereby the terminal can be caused to be forcibly handed over (offloaded) from the macro cell to the small cell.

With the CIO set higher in the expression (1), a number of terminals to be handed over increases. On the other hand, when the handover to the small cell whose actual reception quality is lower than that of the macro cell is performed based on the CRE, the reception quality of the terminal may be degraded due to interference from the macro cell, and radio link failure (RLF) may occur. In other words, with the CIO set higher, a probability of occurrence of the RLF (e.g., RLF rate) is increased. When the RLF occurs, the terminal takes time to be re-connected to an original base station (handover source), thereby generating a packet delay.

To address this issue, WO 2013/136811 A1 discloses a technique for correcting the CIO by mobility robustness optimization (MRO) when a key performance indicator (KPI) (e.g., RLF rate) indicating communication statistical quality is degraded due to update (modification, correction) of the CIO.

SUMMARY

One non-limiting and exemplary embodiment facilitates providing a terminal, a base station, and a communication method capable of appropriately setting the CIO without requiring a long period of time.

In one general aspect, the techniques disclosed here feature a base station in a wireless communication system that performs handover from a cell connected with a terminal to a neighbor cell of the cell. The base station includes: circuitry, which, in operation, sets an offset to be applied to reception quality of the neighbor cell according to a quality of service (QoS) class identifier (QCI) of the terminal when the terminal determines whether to report a measurement result to be used in determination on the handover; and a transmitter, which, in operation, transmits the offset to the terminal.

In another general aspect, the techniques disclosed here feature a communication method in a wireless communication system that performs handover from a cell connected with a terminal to a neighbor cell of the cell. The communication method includes: setting an offset to be applied to reception quality of the neighbor cell according to a quality of service (QoS) class identifier (QCI) of the terminal when the terminal determines whether to report a measurement result to be used in determination on the handover; and transmitting the offset to the terminal.

It should be noted that general or specific embodiments may be implemented as a system, a device, a method, an integrated circuit, a computer program, a storage medium, or any selective combination thereof.

According to one aspect of the present disclosure, the CIO can appropriately be set without requiring a long period of time.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Prior to describing exemplary embodiments according to the present disclosure, a problem found in a conventional technique will briefly be described. When the CIO is corrected using the KPI as in WO 2013/136811 A1, it is necessary to perform measurement for a certain period of time to obtain statistical information, thereby requiring time to correct the CIO.

Hereinafter, the exemplary embodiments according to the present disclosure will be described in detail with reference to the drawings.

First Exemplary Embodiment

[Outline of Wireless Communication System]

Figure 1:
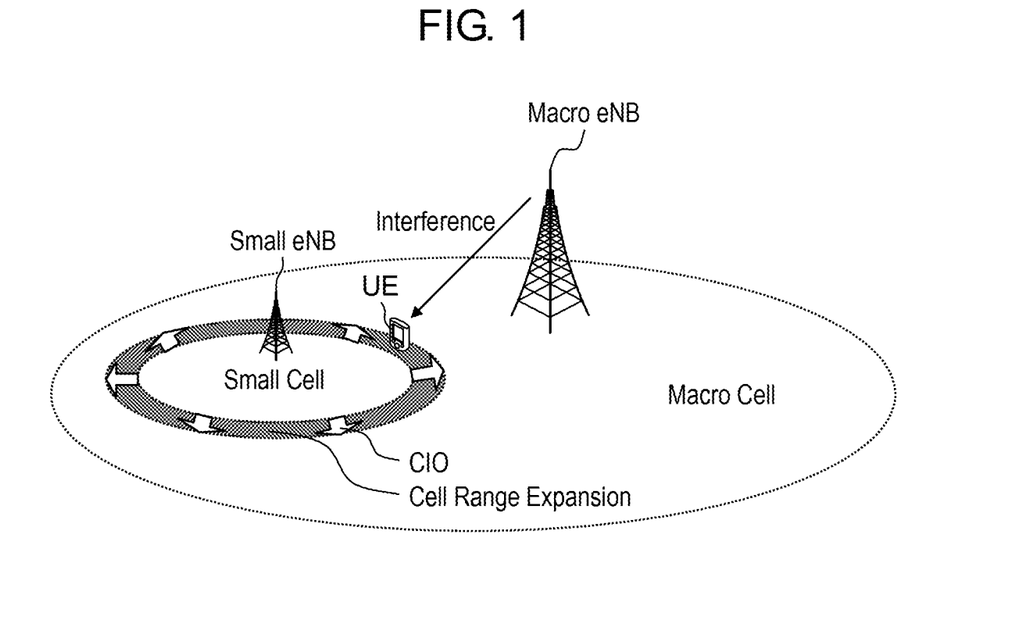
FIG. 1 is a view illustrating a configuration example of a wireless communication system according to a first exemplary embodiment.

FIG. 1 is a view illustrating an example of a wireless communication system according to one aspect of the present disclosure. The wireless communication system illustrated in FIG. 1 includes at least a macro base station (Macro eNB) that covers a macro cell, a small base station (Small eNB) that covers a small cell at least a part of which overlaps the macro cell, and a terminal (UE).

In the wireless communication system illustrated in FIG. 1, handover is performed from a cell (e.g., macro cell) connected with the terminal to a neighbor cell (e.g., small cell) of the cell. For example, when traffic offloading is performed, the macro base station sets a CIO to perform the handover of the terminal from the macro cell to the small cell, as illustrated in FIG. 1. Note that in the present exemplary embodiment, the CIO is an offset set for each terminal (details will be described later).

Figure 2:
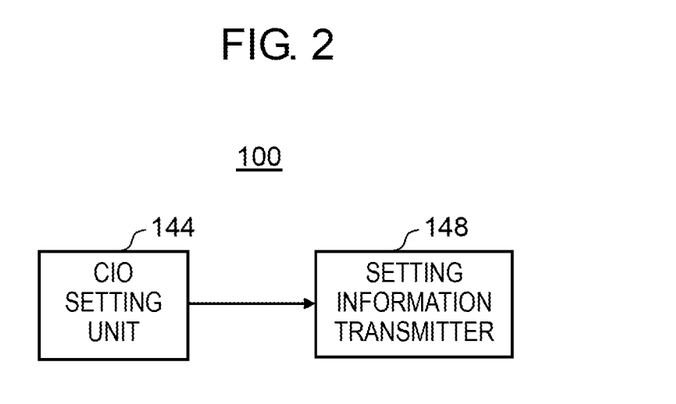
FIG. 2 is a block diagram illustrating a part of configuration of a base station according to the first exemplary embodiment.

FIG. 2 is a block diagram illustrating a part of configuration of base station 100 according to a first exemplary embodiment of the present disclosure. Base station 100 illustrated in FIG. 2 is, for example, the macro base station or the small base station illustrated in FIG. 1. In base station 100 illustrated in FIG. 2, CIO setting unit 144 sets an offset (CIO) to be applied to the reception quality of a cell of a handover destination (Neighbor Cell) according to a QoS class identifier (QCI) of the terminal, when the terminal determines whether to report a measurement result (Measurement Report) that is to be used in determination on the handover. Setting information transmitter 148 transmits the set offset to the terminal.

[Configuration of Base Station 100]

Figure 3:
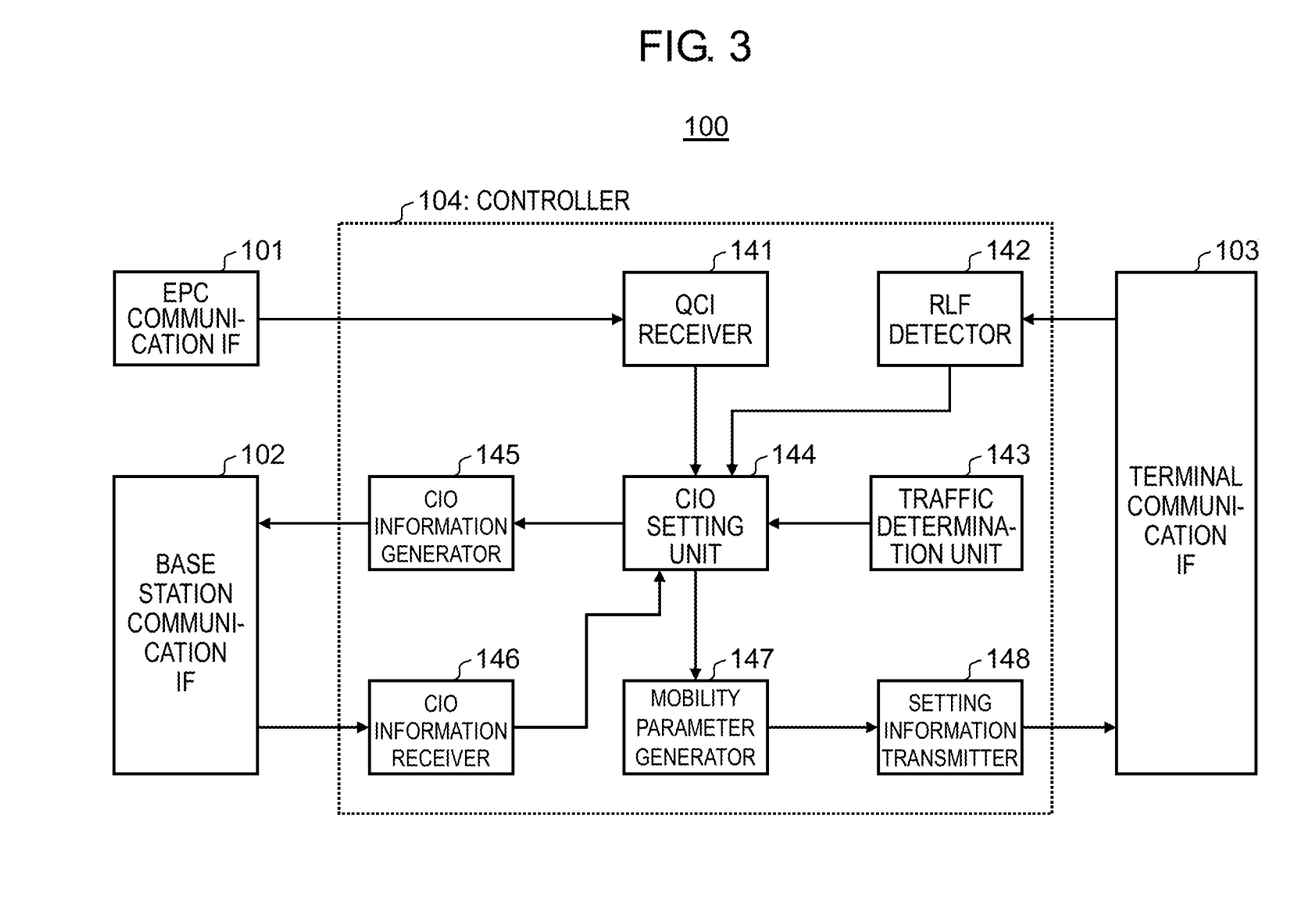
FIG. 3 is a block diagram illustrating a configuration of the base station according to the first exemplary embodiment.

FIG. 3 is a block diagram illustrating a configuration of base station 100 according to the present exemplary embodiment. In FIG. 3, base station 100 includes evolved packet core (EPC) communication interface (IF) 101, base station communication IF 102, terminal communication IF 103, and controller 104.

EPC communication IF 101 is an interface that performs communication between base station 100 and the EPC.

Base station communication IF 102 is an interface that performs communication between base station 100 and another base station (e.g., small base station).

Terminal communication IF 103 is an interface that performs communication between base station 100 and a terminal to be connected to base station 100.

Controller 104 performs control of the setting of the CIO that is a parameter (a parameter for the handover) to be used by the terminal for measurement of the reception quality.

Controller 104 illustrated in FIG. 3 includes QoS class identifier (QCI) receiver 141, RLF detector 142, traffic determination unit 143, CIO setting unit 144, CIO information generator 145, CIO information receiver 146, mobility parameter generator 147, and setting information transmitter 148.

Note that, FIG. 3 illustrates configuration units that perform control of the setting of the CIO in controller 104, but controller 104 may perform processing (not illustrated) of the handover based on the measurement result (Measurement Report) that is reported from the terminal, for example.

Figure 4:
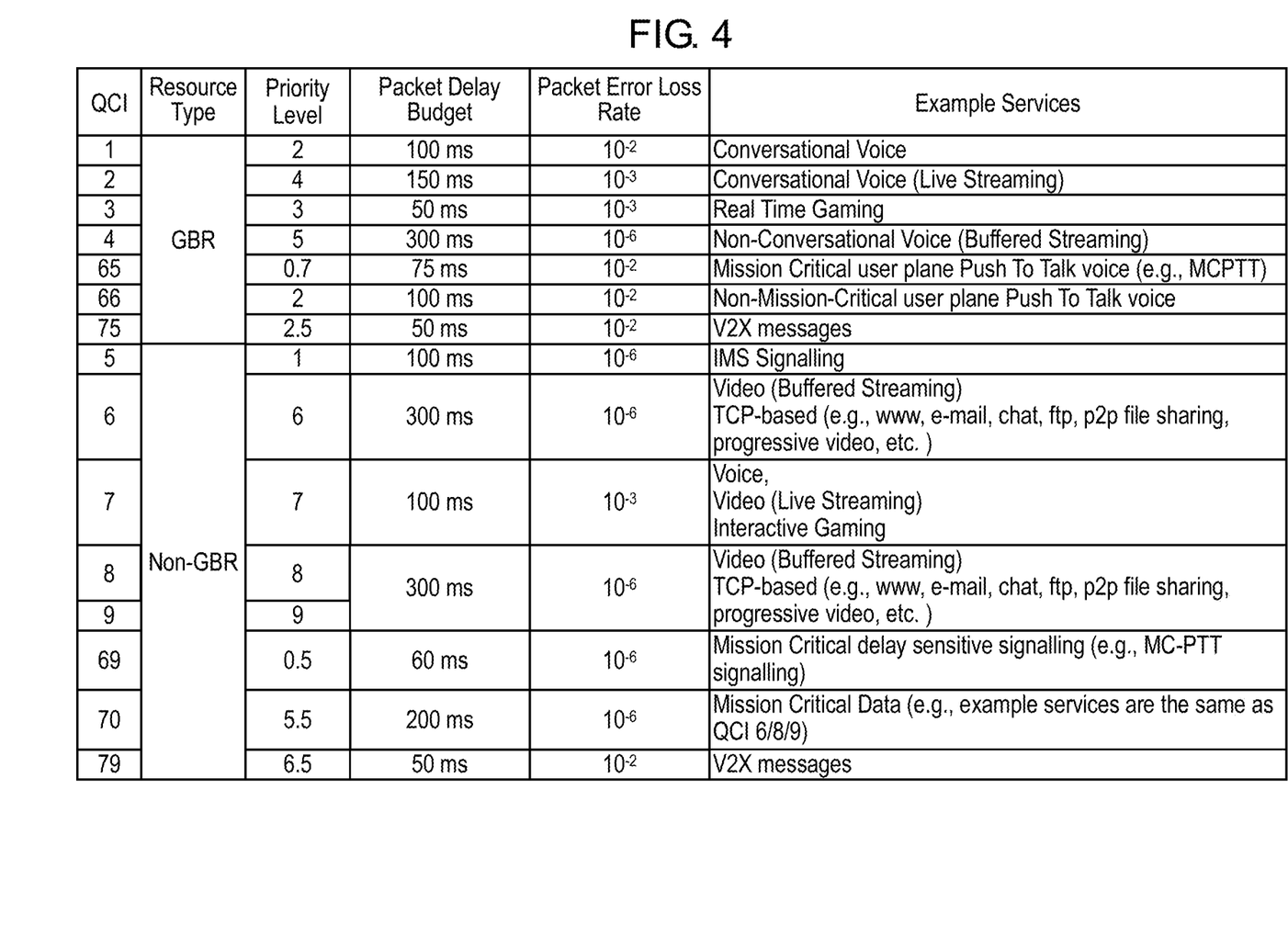
FIG. 4 is a view illustrating an example of a QCI.

QCI receiver 141 receives the QCI for each terminal present in the cell of base station 100 from the EPC through EPC communication IF 101. For example, as illustrated in FIG. 4, the QCI is associated with an allowable delay time (packet delay budget) indicating an allowable packet delay time, an allowable packet loss (packet error loss rate), and the like according to supposed service in the terminal (e.g., refer to 3GPP TS 23.203 V14.2.0, "Policy and charging control architecture (Release 14)", 2016-12). QCI receiver 141 outputs information indicating the allowable delay time corresponding to the QCI of each terminal to CIO setting unit 144.

RLF detector 142 detects occurrence of the RLF in the terminal based on information fed back from the terminal through terminal communication IF 103. For example, RLF detector 142 may detect occurrence of the RLF in the terminal when receiving a re-connection request (e.g., RRC connection Re-establishment Request) to a wireless link, from the terminal. Note that a detection method of the RLF in RLF detector 142 is not limited to this method. RLF detector 142 outputs the detection result of the RLF to CIO setting unit 144.

Traffic determination unit 143 measures a wireless traffic amount in base station 100, and determines whether the wireless traffic amount exceeds a threshold (whether the traffic is high). In other words, traffic determination unit 143 determines whether the traffic offloading to the neighbor cell is required. Traffic determination unit 143 outputs the determination result to CIO setting unit 144.

When the determination result input from traffic determination unit 143 indicates that the traffic offloading is required (or when indicating that the traffic is high), CIO setting unit 144 sets the CIO for each terminal based on the information indicating the allowable delay time input from QCI receiver 141. For example, CIO setting unit 144 may compare the allowable delay time with a threshold, and set the CIO based on the comparison result. For example, CIO setting unit 144 sets $CIO_{UE}$ according to the following expression (2).

$$CIO_{UE}=CIO_{base\_small}+\alpha_{QCI} \qquad (2)$$

In the expression (2), $CIO_{base\_small}$ indicates a value of the CIO as a reference, and $\alpha_{QCI}$ is variably set according to the QCI (allowable delay time) set to each terminal. In other words, $CIO_{UE}$ indicated in the expression (2) is set as the CIO indicated in the expression (1).

CIO setting unit 144 outputs information indicating the set CIO to mobility parameter generator 147. Note that the information indicating the CIO may be information indicating $CIO_{UE}$ indicated in the expression (2), or may be information indicating $\alpha_{QCI}$ in the expression (2) when $CIO_{base\_small}$ in the expression (2) is commonly set to terminals in a corresponding cell.

CIO setting unit 144 also outputs information on the CIO setting (hereinafter, referred to as a CIO correction policy) to CIO information generator 145. The information on the CIO setting may be information indicating $\alpha_{QCI}$ in the expression (2) and/or information indicating a threshold to be compared with the allowable delay time, for example.

Note that details of the CIO setting method in CIO setting unit 144 will be described later.

After the terminal set with the CIO as indicated in the expression (2) is handed over, when RLF detector 142 detects the RLF of this terminal, CIO setting unit 144 resets (corrects) the CIO. Specifically, after the terminal is handed over from the call of base station 100, when the RLF occurs in the terminal, base station 100 decreases the CIO for this terminal. For example, when setting $\alpha_{QCI}$ that is larger than 0 ($\alpha_{QCI}>0$) to the terminal, CIO setting unit 144 may reset $\alpha_{QCI}$ less than or equal to 0 ($\alpha_{QCI}\leq 0$) to the terminal when the RLF occurs in the terminal. The CIO thus reset is transmitted by setting information transmitter 148 to the terminal, similar to the above description.

Further, when receiving a CIO correction policy of another neighbor cell ($\alpha_{QCI}$ indicated in the expression (2), e.g., the threshold of the allowable delay time) from CIO information receiver 146 to be described later, CIO setting unit 144 sets the CIO to be used upon determination on the handover from the cell of the own station to the other neighbor cell based on the CIO correction policy of the other neighbor cell.

CIO information generator 145 generates CIO information including the CIO correction policy input from CIO setting unit 144, and transmits the information to the other neighbor cell (e.g., a handover destination of the terminal) through base station communication IF 102.

CIO information receiver 146 receives, through base station communication IF 102, the CIO information including the CIO correction policy transmitted from the other neighbor cell (that is, information on CIO setting in base station 100 of the other cell), and outputs the information to CIO setting unit 144.

For example, the CIO correction policy may be transmitted or received while being included in a mobility change request massage, or transmitted or received while being included in existing or new other signaling.

Mobility parameter generator 147 generates a mobility parameter (setting information) including information on the CIO input from CIO setting unit 144, and outputs the generated setting information to setting information transmitter 148.

Setting information transmitter 148 transmits the setting information (including the CIO) input from mobility parameter generator 147 to each terminal through terminal communication IF 103. For example, setting information transmitter 148 may transmit the setting information with upper-level signaling (e.g., Radio Resource Control (RRC) message) unique to each terminal.

On the other hand, when receiving the setting information transmitted from base station 100, the terminal compares the reception quality of the cell to which the terminal is connected (Source Cell) with the reception quality in which the CIO is added to the reception quality of the neighbor cell (Neighbor Cell) (e.g., refer to the expression (1)) using the CIO included in the setting information, and determines whether to report the measurement result to base station 100. Note that the measurement result may be reference signal received power (RSRP), reference signal received quality (RSPQ), or another parameter indicating other reception quality, for example.

[Operation of Wireless Communication System]

An operation of the wireless communication system including base station 100 having the above configuration will be described in detail.

<Setting method of CIO>

Figure 5:
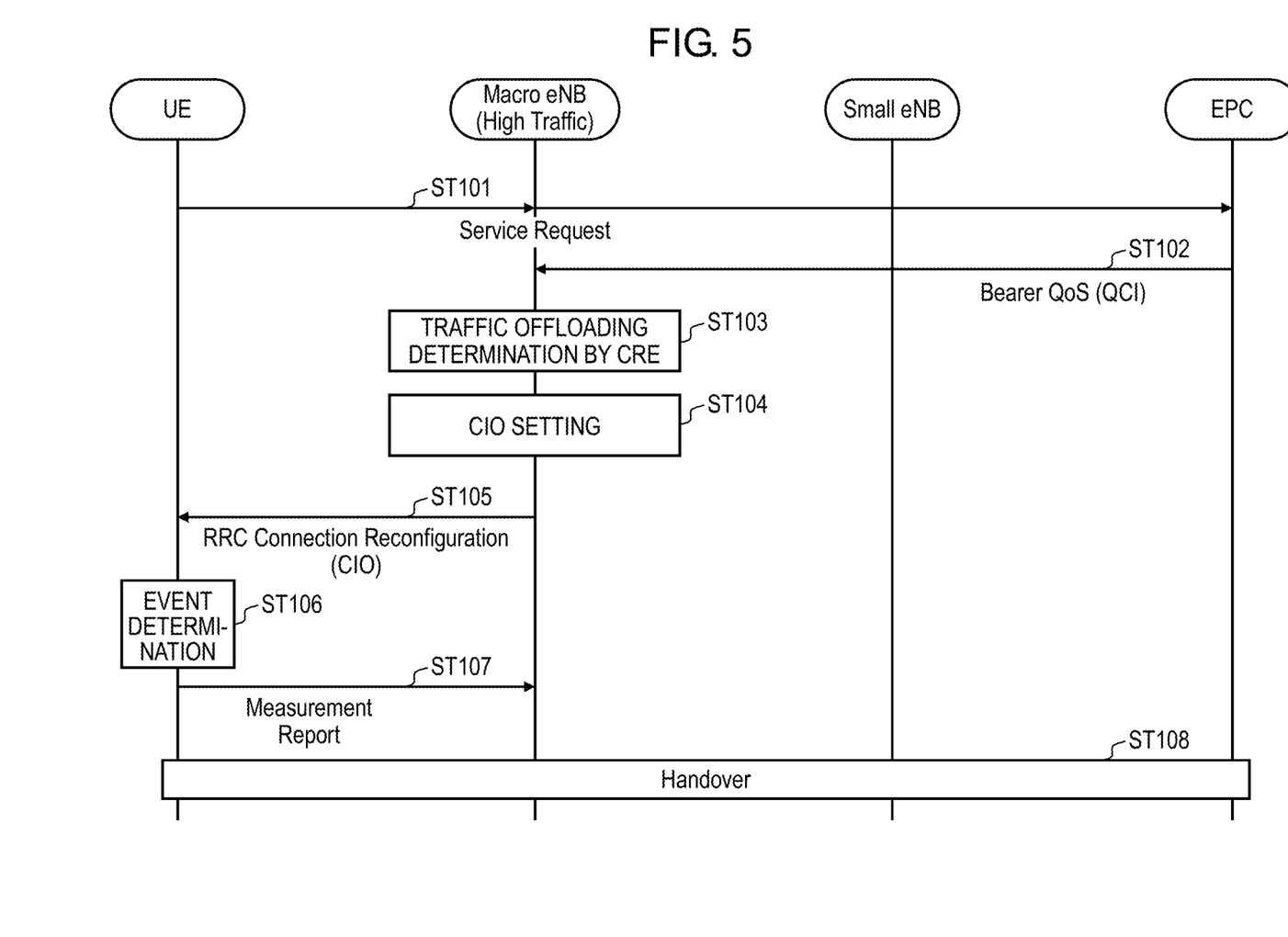
FIG. 5 is a sequence diagram illustrating an example operation of CIO setting according to the first exemplary embodiment.

FIG. 5 is a sequence diagram illustrating the operation of the wireless communication system for the CIO setting. In FIG. 5, at least one terminal (UE) is connected to the macro base station (macro eNB: base station 100). The macro base station in FIG. 5 is in a high traffic state.

First, the terminal transmits a service request (Service Request (SR)) or a connection request (Attach Request) to the EPC through the macro base station (ST 101). When receiving the service request or the connection request from the terminal, the EPC transmits, to the macro base station, information for controlling QoS of a bearer for the UE (ST102). This information includes the QCI (e.g., refer to FIG. 4) corresponding to the service request from the terminal.

Next, the macro base station determines to perform the traffic offloading, since the macro base station is in the high traffic state (ST 103). The macro base station then sets the CIO for the terminal (ST 104). Specifically, the macro base station determines $CIO_{UE}$ (that is, $\alpha_{QCI}$) indicated in the expression (2), based on the allowable delay time corresponding to the QCI for the terminal, which is transmitted from the EPC in ST102.

For example, the macro base station compares the allowable delay time corresponding to the QCI with a threshold (e.g., 200 ms). The macro base station sets a value less than or equal to 0 to $\alpha_{QCI}$ when the allowable delay time is less than or equal to the threshold (allowable delay time ≤200 ms), and sets a value more than 0 to $\alpha_{QCI}$ when the allowable delay time is longer than the threshold (allowable delay time >200 ms). In other words, when the allowable delay time is less than or equal to the threshold, $CIO_{UE}$ is decreased, and when the allowable delay time is longer than the threshold, $CIO_{UE}$ is increased. Note that the threshold is not limited to 200 ms, and may be another value.

Note that, with the allowable delay time being shorter, which is less than or equal to the threshold, the macro base station (CIO setting unit 144) may set a value of $\alpha_{QCI}$ smaller, and with the allowable delay time being longer, which is more than the threshold, the macro base station (CIO setting unit 144) may set the value of $\alpha_{QCI}$ larger. In other words, with the allowable delay time corresponding to the QCI of the terminal being longer, the macro base station may set $CIO_{UE}$ higher. For example, the value of $\alpha_{QCI}$ may be a value corresponded to the QCI (refer to FIG. 4) on a one-to-one basis, or may be calculated from the allowable delay time corresponding to the QCI.

Next, the macro base station notifies a corresponding terminal of the CIO ($CIO_{UE}$ or $\alpha_{QCI}$) set in ST 104 (ST 105). For example, base station 100 may include the CIO in an RRC Connection Reconfiguration message. Note that a message used for notice of the CIO is not limited to RRC Connection Reconfiguration.

The terminal then determines whether to satisfy an event condition that reports the measurement result, that is, a condition triggering the handover (e.g., the expression (1)), using the CIO received in ST 105 (ST 106).

As described above, when the allowable delay time of the terminal is less than or equal to the threshold (allowable delay time ≤200 ms), for example, when a relation of QCI=1, 2 (VoLTE), or 65, 66 (MCPTT) is satisfied in FIG. 4, the CIO to be set to the terminal is decreased. Hence, this case is less likely to satisfy the condition indicated in the expression (1). Therefore, the traffic offloading is less likely to be performed to the terminal having the short allowable delay time, whereby occurrence of the RLF due to performance of the traffic offloading, that is, the packet delay can be suppressed. In other words, the traffic offloading is not performed to the terminal having the short allowable delay time, whereby the allowable delay time (QoS) of this terminal can be satisfied.

On the other hand, when the allowable delay time of the terminal is longer than the threshold (e.g., allowable delay time >200 ms), for example, when a relation of QCI=4 (Buffered Streaming), or 6, 8, 9 (mail, chat, web) is satisfied in FIG. 4, the CIO to be set to the terminal is increased. Hence, this case is likely to satisfy the condition indicated in the expression (1). Therefore, the traffic offloading is likely to occur to the terminal having the long allowable delay time. Further, the traffic offloading is likely to be performed, whereby the RLF is likely to occur. However, the terminal having the long allowable delay time can allow the packet delay due to the RLF until re-connection with the base station.

Next, in ST 106 illustrated in FIG. 5, for example, it is supposed that reception quality calculated by adding the CIO notified in ST 105 to the reception quality of the small base station becomes higher than the reception quality of the macro base station, and the event condition (expression (1)) is satisfied. In this case, the terminal transmits the measurement result (Measurement Report) to the macro base station (ST 107). The macro base station performs handover processing for the terminal from the macro cell to the small cell based on the measurement result from the terminal (ST 108).

As described above, the macro base station (base station 100) sets the CIO for each terminal based on the allowable delay time corresponding to the QCI of each terminal. This enables determination as to whether the traffic offloading is to be performed according to the allowable delay time set for each terminal. In other words, the macro base station sets the CIO in consideration of the QoS set for each terminal, whereby the traffic offloading can be performed while satisfying QoS requirements of each terminal.

<Operation Upon Occurrence of RLF After Handover>

Subsequently, an operation for resetting the CIO when the RLF is detected in the terminal after the handover of the terminal from the macro cell to the small cell succeeds (after ST 108 illustrated in FIG. 5) will be described.

Figure 6:
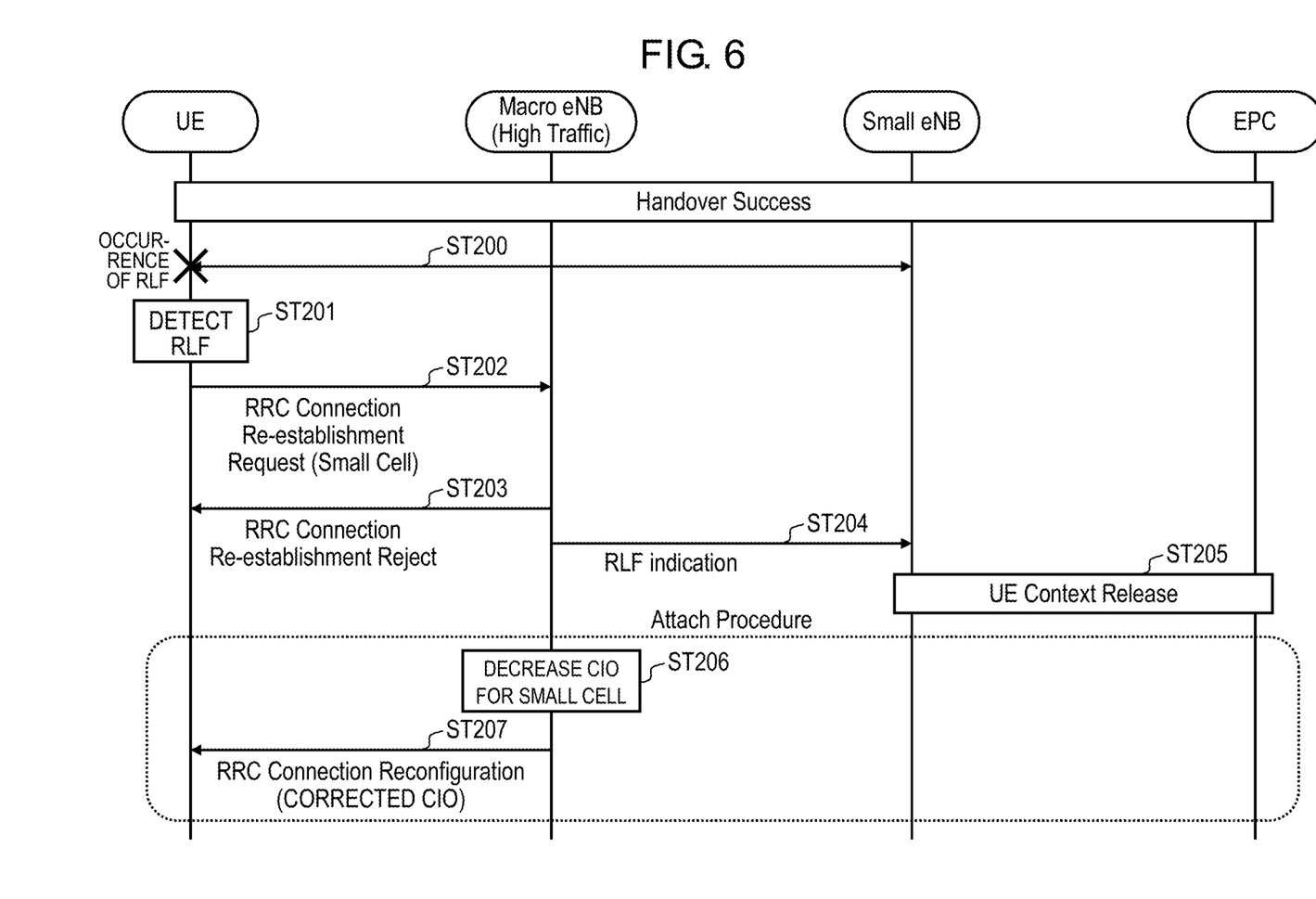
FIG. 6 is a sequence diagram illustrating an example operation upon occurrence of RLF according to the first exemplary embodiment.

FIG. 6 is a sequence diagram illustrating an operation of the wireless communication system for resetting the CIO. In FIG. 6, after the handover from the macro cell to the small cell succeeds, the RLF occurs in communication between the terminal and the small base station (ST 200).

In this case, when detecting the RLF in communication with the small base station (ST 201), the terminal transmits a massage (RRC Connection Re-establishment Request) for re-establishing a radio link with the small base station (Small Cell) to the macro base station (base station 100) (ST 202). With this transmission, the macro base station (RLF detector 142) detects occurrence of the RLF in the terminal.

In this case, for example, the terminal is re-connected to the cell of a handover source (herein, macro base station). The macro base station then transmits a massage (RRC Connection Re-establishment Reject) for rejecting radio link re-establishment between the terminal and the small base station to the terminal (ST 203), and notifies the small base station of a message (RLF indication) indicating the occurrence of the RLF in the terminal (ST 204). When receiving the notice of the occurrence of the RLF in the terminal in ST 204, the small base station and the EPC release information on the terminal (UE context) (ST 205).

Next, an attach process for re-connecting the terminal to the macro base station (handover source) is performed. The macro base station (CIO setting unit 144) performs a normal attach process and correction for decreasing the CIO set in ST 104 illustrated in FIG. 5, for example (ST 206). The macro base station then transmits the CIO after correction (corrected CIO) to the terminal (ST 207). The corrected CIO may be included in an RRC Connection Reconfiguration message for re-connecting of the radio link as illustrated in FIG. 6, or may be included in another signaling message.

The terminal performs event determination using the corrected CIO after receiving the corrected CIO (not illustrated).

As described above, when the RLF occurs in the terminal after the handover to the small cell (traffic offloading), the macro base station re-connects the terminal to the macro cell of the handover source, and corrects (decreases) the CIO for the terminal. With this configuration, after being re-connected to the macro cell, the terminal is less likely to satisfy the condition indicated in the expression (1). In other words, in a communication environment similar to previous handover to the small cell, the handover (traffic offloading) of the terminal to the small cell again can be avoided, and a probability of re-occurrence of the RLF in the terminal can be reduced.

The corrected CIO is set for each terminal according to an occurrence situation of the RLF of the terminal. Therefore the macro base station can flexibly control the traffic offloading according to a communication situation of each terminal, in comparison with a case where a common CIO is applied to a plurality of terminals.

Subsequently, an operation for notice of the CIO correction policy between cells (between base stations) will be described.

Figure 7:
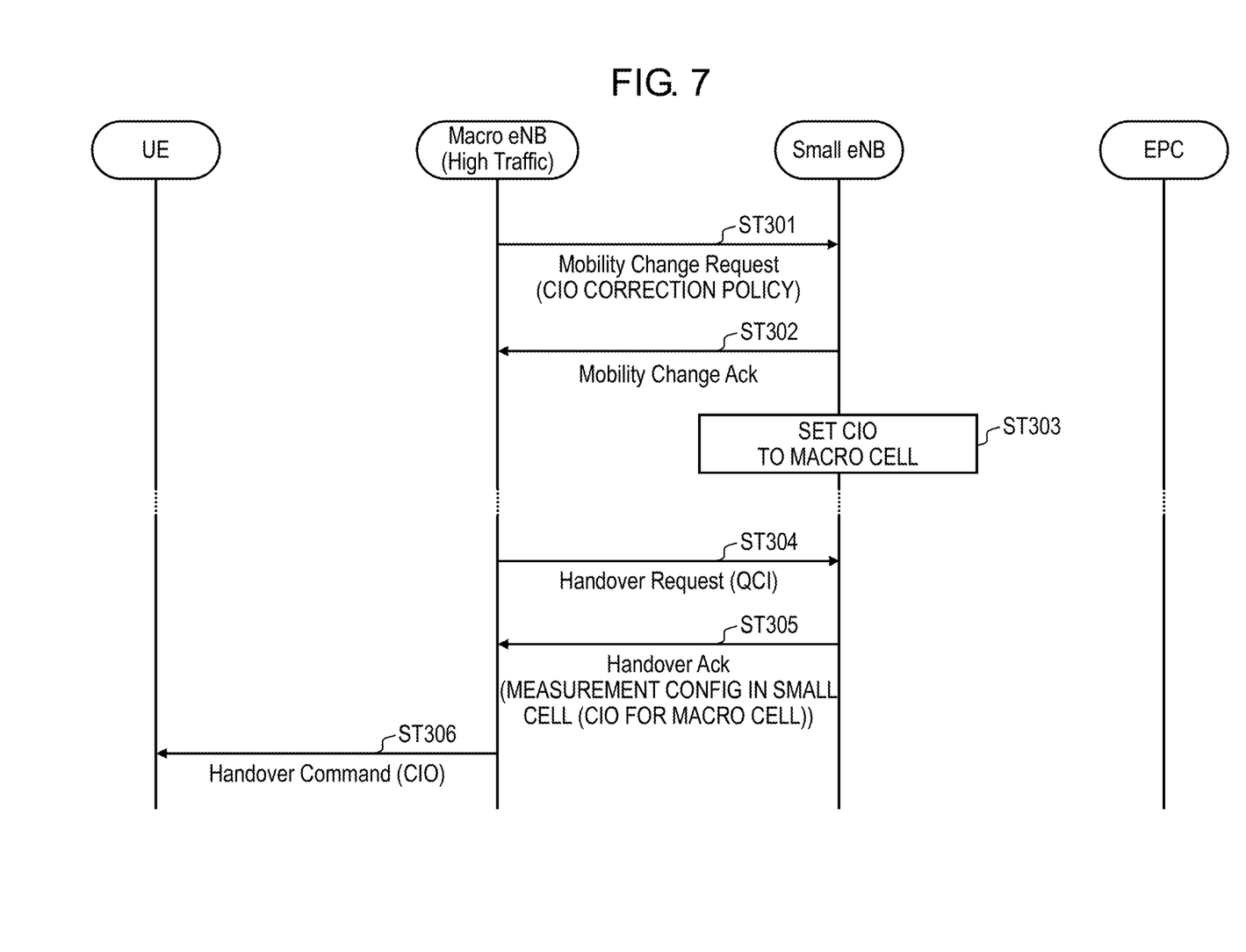
FIG. 7 is a sequence diagram illustrating an example operation upon transmission of a CIO correction policy according to the first exemplary embodiment.

FIG. 7 is a sequence diagram illustrating an operation of the wireless communication system for notice of the CIO correction policy. Processing illustrated in FIG. 7 is performed, for example, after the CIO for the handover to the small cell is set in the macro base station (e.g., after ST 104 in FIG. 5, or ST 206 in FIG. 6).

Figure 8:
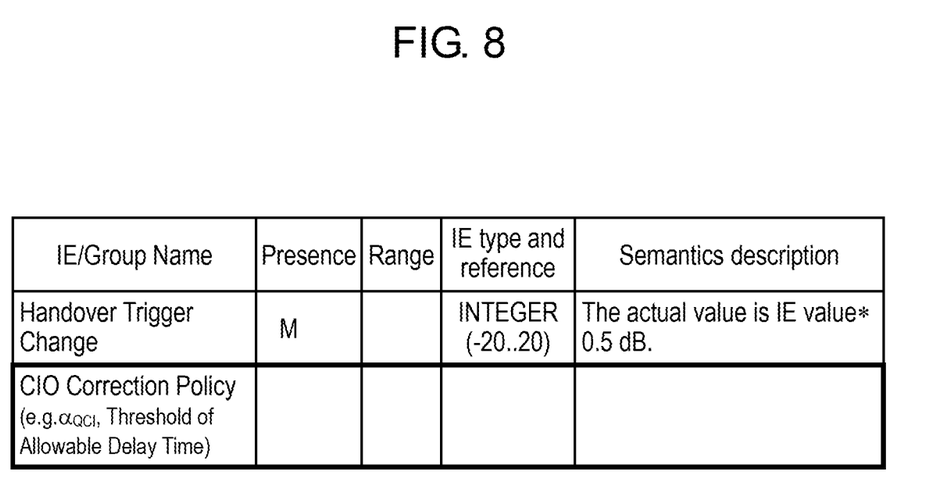
FIG. 8 is a view illustrating an example of mobility parameters information according to the first exemplary embodiment.

Specifically, the macro base station includes the CIO correction policy for the set CIO (e.g., the threshold for the allowable delay time or $\alpha_{QCI}$) into a message for requesting change of the Mobility parameter (Mobility Change Request), and notifies the small base station of this message (ST 301). Note that, with respect to the CIO correction policy, for example, FIG. 8 illustrates an example in which the CIO correction policy is included in "Mobility Parameters Information" described in 3GPP TS 36.423 V13.6.0, "X2 application protocol (X2AP) (Release 13)", 2017-01. The CIO correction policy is a parameter uniquely set to each terminal, and may be included in a message to be notified uniquely to each terminal without being limited to mobility change request.

When receiving the CIO correction policy in ST 301, the small base station transmits, to the macro base station, a response (Mobility Change Ack) to mobility change request (ST 302).

The small base station (CIO setting unit 144) sets the CIO for the handover from the small cell to the macro cell using the CIO correction policy received in ST 301 (ST 303).

For example, an occurrence condition of an event for reporting the measurement result (Measurement Report) to be used in determination on the handover from the small cell (Source Cell) to the macro cell (Neighbor Cell) by the terminal is expressed as follows.

(Reception quality of macro cell (Neighbor Cell))+ CIO>(reception quality of small cell (Source Cell))   (3)

In other words, the terminal connected to the small cell reports the measurement result to the small base station based on the condition in the expression (3). In the expression (3), by setting the CIO lower, apparent reception quality of the macro cell is decreased (that is, apparent reception quality of the small cell is increased), whereby the handover from the small cell to the macro cell is less likely to occur.

In ST 303, for a terminal corresponding to the CIO correction policy notified from the macro base station, the small base station subtracts $\alpha_{QCI}$ included in the CIO correction policy from $CIO_{base\_macro}$ serving as a reference, as the CIO ($CIO_{UE}$) in the expression (3), for example, as indicated in the following expression (4).

$$CIO_{UE} = CIO_{base\_macro} - \alpha_{QCI} \qquad (4)$$

Herein, $CIO_{base\_macro}$ differs from $CIO_{base\_small}$ for the small base station used for calculation of $CIO_{UE}$ (expression (2)) set in the macro base station. In other words, when $\alpha_{QCI}$ is added to $CIO_{base\_small}$ in the expression (2) upon determining the handover (Event determination) from the macro cell to the small cell, $\alpha_{QCI}$ is subtracted from $CIO_{base\_macro}$ in the expression (4) upon determining the handover (Event determination) from the small cell to the macro cell. Similarly, when $\alpha_{QCI}$ is subtracted from $CIO_{base\_small}$ in the expression (2) upon determining the handover from the macro cell to the small cell, $\alpha_{QCI}$ is added to $CIO_{base\_macro}$ in the expression (4) upon determining the handover (Event determination) from the small cell to the macro cell. In other words, the CIO used for determining the handover (Event determination) from the small cell to the macro cell is decreased/increased, by an amount ($\alpha_{QCI}$) of increase/decrease of the CIO used for determining the handover (Event determination) from the macro cell to the small cell.

This can avoid occurrence of the handover in a ping-pong manner between the macro cell and the small cell.

For example, when the reception quality of the small cell is lower than the reception quality of the macro cell, it is supposed that $\alpha_{QCI} > 0$ is set in the expressions (1), (2) (that is, apparent reception quality of the small cell is increased by $\alpha_{QCI}$), and the terminal is handed over from the macro cell to the small cell. In this case, when $\alpha_{QCI}$ set in the macro base station is not taken into consideration in the small cell of a handover destination, the terminal is handed over to the macro cell whose reception quality is higher than that of the small cell according to the expression (3). In other words, a handover condition from the macro cell to the small cell and a handover condition from the small cell to the macro cell are satisfied at the same time, whereby the handover occurs repeatedly (occurrence of the handover in the ping-pong manner). In contrast, according to the present exemplary embodiment, the CIO correction policy is shared between the cell of the handover source and the cell of the handover destination, whereby occurrence of the handover in the above ping-pong manner can be prevented.

Next, in FIG. 7, it is supposed that, after the CIO is set to the macro cell in the small base station (after ST 303), the handover of the terminal from the macro cell to the small cell is performed (e.g., ST 108 in FIG. 5).

In this case, in the sequence of the handover processing, the macro base station notifies the small base station of a handover request (Handover request) (ST 304).

In a response (Handover Ack) to the handover request, the small base station includes the CIO (the CIO for the macro cell) set from the QCI information received with Handover Request in ST 304 based on the CIO correction policy received in ST 301, in the setting information in the small cell (Measurement Config in Small Cell), and transmits the information to the macro base station (ST 305).

When receiving Handover Ack (including the CIO for the macro cell) from the small base station in ST 305, the macro base station transmits Handover Command to the terminal (ST 306). With this operation, the handover from base station 100 to the small base station is performed in the UE. The macro base station may transmit Handover Command while including the CIO for the macro cell. The terminal performs the handover to the small cell, and then determines the condition (event) in the expression (3) using the CIO ($\alpha_{QCI}$) received in ST 306.

The operation in the wireless communication system has been described above.

As described above, in the present exemplary embodiment, base station 100 sets the CIO for each terminal based on the QCI of each terminal. Herein, as illustrated in FIG. 5, the QCI is a parameter received by base station 100 (e.g., macro base station) from the EPC when the terminal issues the service request. In other words, the QCI is a parameter already identified by base station 100 when determining the handover (including Event determination of the terminal) using the CIO. Accordingly, base station 100 does not have to measure the reception quality for a certain period of time as in communication statistical quality (KPI), upon setting the CIO.

As described above, according to the present exemplary embodiment, base station 100 can appropriately set the CIO without requiring a long period of time.

If the CIO that is an offset uniquely set to each cell is commonly set to the terminals in the cell, control of the traffic offloading in consideration of the QoS for each terminal is difficult. In contrast, in the present exemplary embodiment, the CIO is set for each terminal, whereby the traffic offloading can be performed while satisfying QoS requirements of the terminal. In other words, when there is a high possibility that the QoS requirements of the terminal are not satisfied, the traffic offloading (handover) for this terminal is not performed. Therefore, according to the present exemplary embodiment, the traffic offloading can be controlled flexibly in consideration of the QoS for each terminal.

Second Exemplary Embodiment

A base station according to the present exemplary embodiment is common to base station 100 according to the first exemplary embodiment in basic configuration, and therefore will be described with reference to FIG. 3.

In the first exemplary embodiment, a case where the CIO is set based on the allowable delay time corresponding to the QCI of the terminal has been described. In contrast, in the present exemplary embodiment, a case where base station 100 sets the CIO based on an allowable packet loss corresponding to the QCI of the terminal will be described. In other words, in the present exemplary embodiment, the "allowable delay time" in the operation for CIO setting, which has been described in the first exemplary embodiment, can be replaced by the "allowable packet loss".

Specifically, QCI receiver 141 in base station 100 outputs information indicating the allowable packet loss (packet error loss rate) included in the QCI to CIO setting unit 144. CIO setting unit 144 then determines $\alpha_{QCI}$ indicated in the expression (2) based on the allowable packet loss corresponding to the QCI of the terminal upon setting the CIO for the terminal (ST 104 in FIG. 5).

For example, upon setting the CIO, the macro base station compares the allowable packet loss corresponding to the QCI with a threshold. The macro base station sets a value less than or equal to 0 to $\alpha_{QCI}$ when the allowable packet loss is less than or equal to the threshold, and sets a value more than 0 to $\alpha_{QCI}$ when the allowable packet loss is more than the threshold. Note that, with the allowable packet loss being larger, the macro base station (CIO setting unit 144) may set $CIO_{UE}$ higher.

As described above, when the allowable packet loss of the terminal is less than or equal to the threshold, the CIO set to the terminal is decreased. Hence, this case is less likely to satisfy the condition indicated in the expression (1). Therefore, the traffic offloading is less likely to be performed to the terminal having decreased allowable packet loss, whereby occurrence of the RLF due to performance of the traffic offloading, that is, occurrence of the packet loss can be suppressed. In other words, the traffic offloading is not performed to the terminal having decreased allowable packet loss, whereby the allowable packet loss (QoS) of this terminal can be satisfied.

On the other hand, when the allowable packet loss of the terminal is more than the threshold, the CIO set to the terminal is increased. Hence, this case is likely to satisfy the condition indicated in the expression (1). Therefore, the traffic offloading is likely to be performed to the terminal having increased allowable packet loss, whereby the RLF (packet loss) is likely to occur. However, the terminal having increased allowable packet loss can allow the packet loss due to the RLF until re-connection with the base station.

As described above, according to the present exemplary embodiment, base station 100 sets the CIO for each terminal based on the allowable packet loss corresponding to the QCI of each terminal. In other words, base station 100 sets the CIO in consideration of QoS set for each terminal, whereby the traffic offloading can be performed while satisfying QoS requirements of each terminal, similar to the first exemplary embodiment.

Also, similar to the first exemplary embodiment, base station 100 sets the CIO based on the QCI that is the parameter already identified by base station 100 when determining the handover (including the Event determination of the terminal) using the CIO. Accordingly, base station 100 does not have to measure the reception quality for a certain period of time as in communication statistical quality (KPI), upon setting the CIO, whereby the CIO can appropriately be set without requiring a long period of time.

Third Exemplary Embodiment

A base station according to the present exemplary embodiment is common to base station 100 according to the first exemplary embodiment in basic configuration, and therefore will be described with reference to FIG. 3.

As described above, when the traffic offloading (handover) is performed while increasing the value of the CIO (e.g., $\alpha_{QCI}$ in the expression (2)), the RLF is likely to occur. In other words, re-connection processing of the terminal to the handover source is likely to occur.

On the other hand, when the handover for the terminal is completed, the base station of the handover source (Source BS) deletes information (UE context) on a terminal performed the handover to another cell (UE context Release).

For this reason, when the RLF occurs in the terminal after completion of the handover, and the terminal is re-connected to the base station of the handover source, the base station of the handover source requires time corresponding to an initial Attach process (sequence) for the terminal.

Then, in the present exemplary embodiment, when setting the value of the CIO higher upon setting the CIO (e.g., in the case of $\alpha_{QCI}>0$ in the expression (2)), base station 100 retains the UE context for the terminal to which the CIO is set for a certain period of time without deleting the UE context. In other words, when the certain period of time elapses after the terminal is handed over, base station 100 deletes the UE context of the terminal handed over to a neighbor cell. In other words, when the certain period of time elapses after the terminal is handed over, base station 100 determines that the terminal is connected in the cell of the handover destination without occurrence of the RLF, and a possibility of re-connection with base station 100 is low.

With this configuration, base station 100 of the handover source retains the UE context of the terminal handed over to the other cell without deleting, and therefore can use the retained UE context when the terminal is re-connected to base station 100 due to the RLF. Accordingly, the Attach process upon re-connecting the terminal to base station 100 can be simplified, and the re-connection can be performed more quickly.

With this configuration, according to the present exemplary embodiment, the packet delay or the packet loss until the terminal is re-connected to base station 100 after the RLF can be reduced.

Note that, in the present exemplary embodiment, the case where the UE context is retained for the certain period of time in the case of $\alpha_{QCI}>0$ has been described. However, a condition for retaining the UE context for the certain period of time is not limited to the case where $\alpha_{QCI}$ is higher than 0 (that is, when $CIO_{base\_small}$ or $CIO_{base\_macro}$ is used as a reference value). In other words, when setting the CIO for the terminal higher than the reference value (a value other than $CIO_{base\_small}$ or $CIO_{base\_macro}$), base station 100 may retain the UE context for the terminal for the certain period of time without deleting, when the terminal is handed over to the neighbor cell.

The exemplary embodiments of the present disclosure have been described above.

Note that at least two of the first to third exemplary embodiments described above may be combined. For example, by combining the first and second exemplary embodiments, base station 100 may set the CIO based on both the allowable delay time and the allowable packet loss indicated in the QCI. At this time, base station 100 may set $\alpha_{QCI}$ corresponding to the combination of the allowable delay time and the allowable packet loss, or may set $\alpha_{QCI}$ using either the allowable delay time or the allowable packet loss according to service supposed in a target terminal.

The present disclosure can be realized by software, hardware, or software in cooperation with hardware. Each functional block used in the description of each exemplary embodiment described above can be partly or entirely realized by an LSI such as an integrated circuit, and each process described in the each exemplary embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a field programmable gate array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus. Some non-limiting examples of such communication apparatus include a phone (e.g., cellular (cell) phone, smart phone), a tablet, a personal computer (PC) (e.g., laptop, desktop, notebook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof. The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)". The communication may include exchanging data through, for example, a cellular system, a wireless LAN system, a satellite system, etc., and various combinations thereof. The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus. The communication apparatus also may include an infrastructure facility, such as a base station, an access point, and any other apparatus, device or system that communicates with or controls apparatuses such as those in the above non-limiting examples.

A base station of the present disclosure relates to a wireless communication system that performs handover from a cell connected with a terminal to a neighbor cell of the cell. The base station includes: circuitry, which, in operation, sets an offset to be applied to reception quality of the neighbor cell according to a quality of service (QoS) class identifier (QCI) of the terminal when the terminal determines whether to report a measurement result to be used in determination on the handover; and a transmitter, which, in operation, transmits the offset to the terminal.

In the base station of the present disclosure, with an allowable delay time corresponding to the QCI of the terminal being longer, the circuitry may set the offset higher.

In the base station of the present disclosure, with an allowable packet loss corresponding to the QCI being larger, the circuitry may set the offset higher.

In the base station of the present disclosure, when radio link failure occurs in the terminal after the terminal is handed over from the cell of the base station to the neighbor cell, the circuitry may reduce the offset for the terminal.

In the base station of the present disclosure, the transmitter may transmit information on setting of the offset to another base station in the neighbor cell.

In the base station of the present disclosure, a receiver that receives information on setting of the offset in the neighbor cell from another base station in the neighbor cell may further be included, and the circuitry may set the offset for determination on handover from the cell of the base station to the neighbor cell based on the information.

In the base station of the present disclosure, when the offset for the terminal is set higher than a reference value, the circuitry may retain the information on the terminal for a certain period of time without deleting the information, when the terminal is handed over to the neighbor cell.

A communication method of the present disclosure relates to a wireless communication system that performs handover from a cell connected with a terminal to a neighbor cell of the cell. The communication method includes: setting an offset to be applied to reception quality of the neighbor cell according to a quality of service (QoS) class identifier (QCI) of the terminal when the terminal determines whether to report a measurement result to be used in determination on the handover; and transmitting the offset to the terminal.

One aspect of the present disclosure is useful for a mobile communication system.

The invention claimed is:

1. A base station in a wireless communication system that performs handover from a cell connected with a terminal to a neighbor cell of the cell, the base station comprising:
   circuitry, which, in operation, sets an offset to be applied to reception quality of the neighbor cell when the terminal determines whether to report a measurement result to be used in determination of the handover,
   wherein the circuitry, in operation, sets a variable offset according to a quality of service (QoS) class identifier (QCI) of the terminal, and adds the variable offset to a reference offset to obtain the offset to be applied to the reception quality of the neighbor cell,
   wherein the circuitry, in operation, sets the variable offset to a value less than or equal to zero to in response to determining that an allowable delay time or an allowable packet loss corresponding to the QCI of the terminal is less than or equal to a threshold, and
   wherein the circuitry, in operation, sets the variable offset to a value greater than zero in response to determining that the allowable delay time or the allowable packet loss corresponding to the QCI of the terminal is greater than the threshold; and
   a transmitter, which, in operation, transmits information indicating the offset to be applied to the reception quality of the neighbor cell to the terminal.

2. The base station according to claim 1, wherein, in response to determining that the allowable delay time corresponding to the QCI of the terminal is larger than the threshold, the circuitry increases the offset to be applied to the reception quality of the neighbor cell.

3. The base station according to claim 1, wherein, in response to determining that the allowable packet loss corresponding to the QCI of the terminal is larger than the threshold, the circuitry increases the offset to be applied to the reception quality of the neighbor cell.

4. The base station according to claim 1, wherein, when radio link failure occurs in the terminal after the terminal is handed over from the cell of the base station to the neighbor cell, the circuitry reduces the offset to be applied to the reception quality of the neighbor cell for the terminal.

5. The base station according to claim 1, wherein the transmitter transmits information on setting of the offset to be applied to the reception quality of the neighbor cell to another base station of the neighbor cell.

6. The base station according to claim 1, further comprising a receiver, which, in operation, receives information on setting of the offset to be applied to the reception quality of the neighbor cell in the neighbor cell from another base station of the neighbor cell, wherein the circuitry sets the offset to be applied to the reception quality of the neighbor cell for determination on the handover from the cell of the base station to the neighbor cell based on the information on setting of the offset to be applied to the reception quality of the neighbor cell in the neighbor cell.

7. The base station according to claim 1, wherein, when the offset to be applied to the reception quality of the neighbor cell for the terminal is set higher than a reference value, the circuitry retains information on the terminal for a certain period of time without deleting the information on the terminal, when the terminal is handed over to the neighbor cell.

8. A communication method in a wireless communication system that performs handover from a cell connected with a terminal to a neighbor cell of the cell, the communication method comprising:

setting an offset to be applied to reception quality of the neighbor cell when the terminal determines whether to report a measurement result to be used in determination of the handover, wherein the setting the offset to be applied to the reception quality of the neighbor cell includes:

setting a variable offset according to a quality of service (QoS) class identifier (QCI) of the terminal, wherein the setting the variable offset includes setting the variable offset to a value less than or equal to zero in response to determining that an allowable delay time or an allowable packet loss corresponding to the QCI of the terminal is less than or equal to a threshold, and wherein the setting the variable offset includes setting the variable offset to a value greater than zero in response to determining that the allowable delay time or the allowable packet loss corresponding to the QCI of the terminal is greater than the threshold, and adding the variable offset to a reference offset to obtain the offset to be applied to reception quality of the neighbor cell; and transmitting information indicating the offset to be applied to the reception quality of the neighbor cell to the terminal.

9. The communication method according to claim 8, wherein the reference offset is commonly set for a plurality of terminals in the neighbor cell.

10. The base station according to claim 1, wherein the reference offset is commonly set for a plurality of terminals in the neighbor cell.

* * * * *